United States Patent Office 3,334,659
Patented Aug. 8, 1967

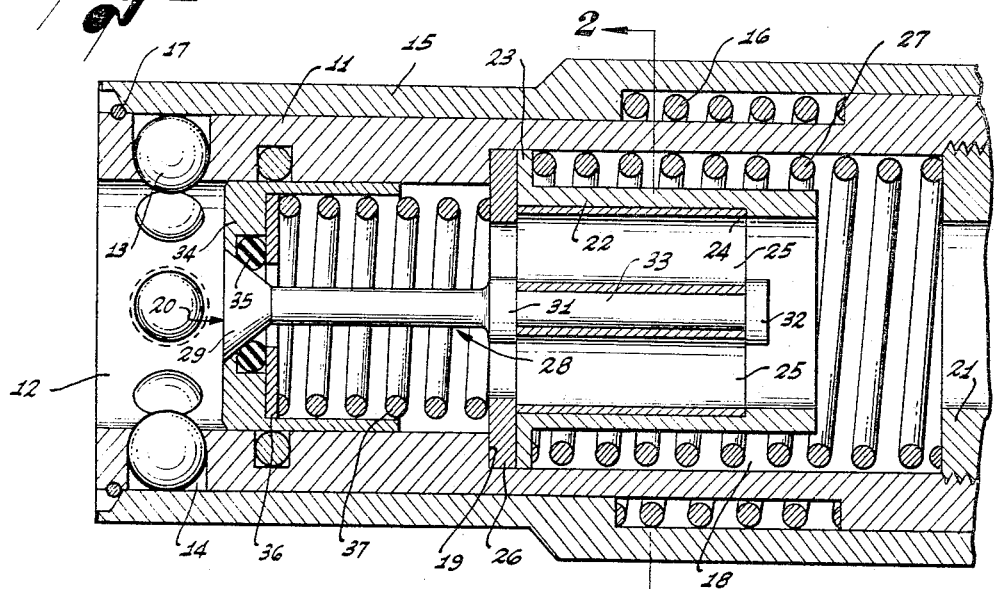
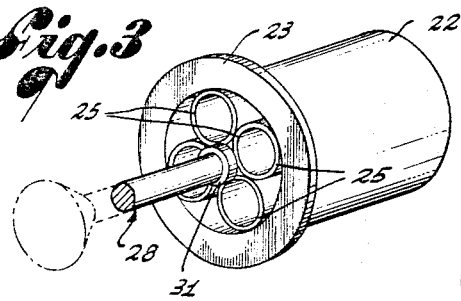
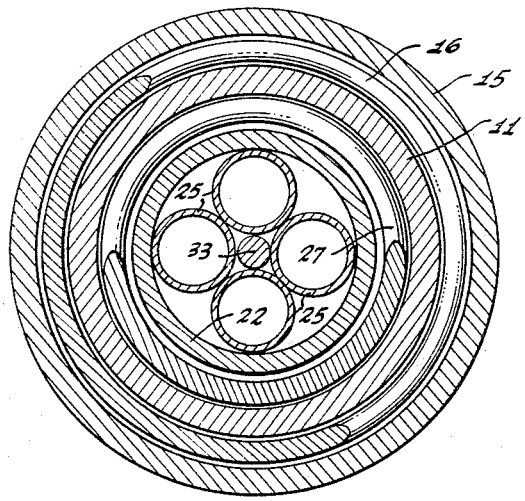
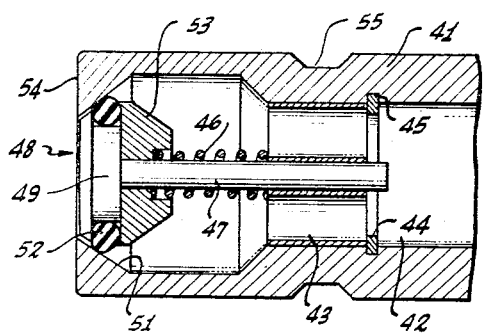

3,334,659
FLOW STREAM IMMERSED SUPPORTING
STRUCTURE
Vincent G. Magorien, Reseda, Calif., assignor to Seaton-Wilson Manufacturing Company, Inc., Burbank, Calif., a corporation of California
Filed Nov. 2, 1964, Ser. No. 408,278
8 Claims. (Cl. 138—39)

The present invention relates generally to supporting structures in the field of hydraulics, and more particularly to structures for supporting or suspending elements in a liquid flow stream with minimal pressure loss past the support.

Such supporting structures have in the past taken the form of expensive milled parts or of elaborate castings which are contoured in various ways to streamline the liquid flow past the supporting structure. While the problem is quite evidently present in the mounting of elements in fluid flow streams generally, it is particularly acute in the more simple devices where the expense of the supporting structure becomes a critical factor in over-all cost. Such devices where an inexpensive, low-loss supporting structure is particularly desired are quick-disconnect couplings, check valves, relief valves, flow sensing devices and the like.

The supporting structure for suspending an element in a flow stream may be stationary and the supported element either stationary or movable relative to the supporting structure which acts as a guide for such movement; or the supporting structure itself may be movably mounted, with or without movement of the mounted or suspended element thereto provided for. The essential features of the supporting structure or mounting according to the present invention are that it be simple and inexpensive, that it hold the supported element at the desired point in the flow passage, and that it provide minimal resistance to the flow which passes through it.

According to the present invention, the problems of suspension and support in a flow stream are solved in a simple and economical manner by the use of a cluster of cylindrical tubes preferably cut from standard stock tubing and disposed between the outer wall of an element to be supported thereby and the inner wall of the flow passage. The diameter or transverse dimension of the supported element and the diameter or other transverse dimension of the surrounding flow passage are desirably selected so as to use standard size tubes in a cluster of three or more with the diameters of the tubes in contact or at most separated only by the production tolerances of the tubing. With three or more tubes, standard stock sizes may be used and the fabrication of the supporting structure requires only the cutting of stock tubing to length. The tubes are prevented from moving outwardly by the wall of the flow passage, and shoulders, snap rings, spring loading and the like are provided to prevent axial movement of the supporting tubes. Since the loads on such supporting structures are usually quite small, the tubes can be of thin wall thickness affording minimum resistance to fluid flow.

It is therefore an object of the present invention to provide a support for suspending an element in a flow stream which is of simple and economical construction and has a minimal pressure loss thereat.

Another object of this invention is the provision of an improved structure for supporting an element at the axis of a flow passage comprised of a cluster of tubes whose axes are parallel to the axis of the flow passage and whose outer surfaces substantially contact each other, the walls of the flow passage and the supported element.

A further object of this invention is the provision of an improved structure for supporting an element at the axis of a flow passage made up of a cluster of standard sized tubes of short length mounted about the element within the flow passage with their axes parallel to the axis of the flow passage.

These and other objects and features of the invention will be readily apparent to those skilled in the art from the following specification and the appended drawing, in which:

FIGURE 1 is a longitudinal sectional view through the female member of a quick-disconnect coupling employing the flow stream support according to the present invention;

FIGURE 2 is a transverse sectional view on the line 2—2 of FIGURE 1;

FIGURE 3 is a perspective view with parts broken away to illustrate the supporting structure according to the present invention; and FIGURE 4 is a longitudinal sectional view taken through the male member of a quick-disconnect coupling and showing the use of a supporting structure according to the present invention.

FIGURES 1 through 3 show a flow stream immersed supporting structure according to the present invention suspending an axial element within the male member of a quick-disconnect coupling of the general type illustrated and described in my Patent No. 3,073,342 granted Jan. 15, 1963, for Airless Coupling. FIGURE 4 shows the flow stream immersed supporting structure suspending an axially movable element within a male member adapted to cooperate with the female member of FIGURES 1–3 to establish a flow passage through the coupling Referring first to the female member of the coupling, there is provided a generally tubular body member 11 having a flow passage 12 therethrough. A plurality of circumferentially arranged balls 13 are received within radial pockets 14 adjacent the open end of the female member, and the tubular body 11 is surrounded by an axially slidable sleeve 15 biased outwardly by a spring 16 against a retaining ring 17 and serving to hold the balls 13 inwardly when the sleeve is in the projected position of FIGURE 1.

The back end of the body member 11 is provided with an enlarged counterbore 18 bounded at the front by a shoulder 19 and at the rear by a threaded cylindrical plug 21. A cylindrical holder 22 having a flange 23 at its forward end is disposed within the counterbore 18 and is provided with an internal shoulder at 24. The tubes of the supporting structure are shown at 25, of an exterior diameter to substantially contact their exterior surfaces as shown in FIGURES 2 and 3, and of a length so that their back ends abut against the shoulder 24 while their forward ends are substantially coplanar with the forward surface of the flange 23. An annular washer 26 is disposed between the shoulder 19 and the flange 23 and a relatively heavy coil spring 27 extends between the back surface of the flange 23 and the forward surface of the plug 21 to bias the holder 22 against the washer 26 and the washer against the shoulder 19.

A valve 20 has a conical head 29 at the forward end of a stem 28 supported axially of the tubular body member 11. The stem 28 has a pair of integral spaced collars 31 and 32 thereon, larger in diameter than the central opening within the cluster of supporting tubes 25 and disposed respectively at the forward and rear edges of the supporting tubes. The rear portion 33 of the stem 28 has a diameter which substantially contacts its outer surface with the surfaces of all of the supporting tubes 25, as shown more particularly in FIGURE 2. The valve 20 is thereby suspended aligned with the axis of the flow passage through the female member of the coupling, being normally in the position shown in FIGURE 1 and being movable, only if the part operation requires it, as a unit with the supporting tubes 25 and the tube holder 22 against the bias of spring 27.

A cup-shaped valve poppet member 34 is supported within the flow passage 12 to be slidable relative to the body 11 toward and away from the valve head 29. A sealing ring 35 surrounds a central recess in the bottom of the poppet member 34 and is held therein by an annular washer 36 and a compression spring 37 extending between the front face of the washer 26 and the rear face of the washer 36 and serving to bias the poppet member 34 outwardly to seal the ring 35 against the conical surface of the valve head 29 in the position shown in FIGURE 1.

Referring now to the male member of FIGURE 4, a tubular body member 41 has an internal bore 42 defining a flow passage therethrough. Within the bore 42 are mounted supporting tubes 43 held at the rear against a snap ring 44 engaged in an annular groove 45. The forward edges of the supporting tubes 43 are engaged and held by a compression spring 46 disposed about the stem of a valve member 48 having a head 49 thereon. The body member 41 has an internal conical surface at 51 engaged in sealing relation by a sealing ring 52 disposed about the head 49. A back-up member 53 holds the sealing ring 52 in position and is engaged by the forward end of the spring 46 to bias the valve member 48 forwardly to engage the sealing ring 52 with the surface 51. The stem 47 of the valve member 48 is of a diameter to engage its outer surface with the outer surfaces of all the supporting tubes 43 in the same manner that the stem portion 33 engages the supporting tubes 25 in FIGURE 2. However, the stem 47 is slidable relative to the supporting tubes 43, which thereby serve as a guide for the sliding movement of the valve member relative to the body member 41.

The operation of the coupling which has been utilized to illustrate and describe the flow stream immersed supporting structure of the present invention is similar to that described in my patent, above identified. The sleeve 15 is first moved back to release the balls 13 for limited outward radial movement to permit the male member to be moved therethrough. Then with the insertion of the male body member 41 into the tubular female body member 11 and the flow passage 12 therein, the face 54 of the male member engages the forward face of the poppet member 34 and moves it, as well as the parts 20, 22, 25, 26 and 37, bodily rearwardly against the bias of the spring 27. The bias of spring 37 is sufficiently greater than that of spring 27 to cause it to move rearwardly as a unit without deflecting until the holder 22 bottoms out against the forward face of plug 21, at which time spring 37 starts to deflect and the head 29, which is already in contact with the valve head 49, causes the valve member 48 to move rearwardly relative to the supporting tubes 43 and the male body member 41, thereby opening a passage between the conical surface 51 and the sealing ring 52. At the same time, the member 34 leaves the head 29, opening a passage thereat. The male member is inserted until a circular recess 55 is adjacent the balls 13, whereupon the sleeve 15 is released to move the balls therein and lock the male member within the female member of the coupling.

The assembly of the flow stream immersed supporting structure of the female member of FIGURES 1–3 will now be described. It will be apparent that to have the outer surface of the tube holder 22, and the outer surface of the portion 33 of the stem 28, the parts must be properly dimensioned. Since it is desired to use standard commercial size tubing, the tubing size and number of tubes are first selected and this will determine the interior diameter of the tube holder 22 and the exterior diameter of the stem portion 33. The selected number of tubes are cut from this standard size tubing of a length to extend between the shoulder 24 and the front face of the flange 23. The collars 31 and 32 are spaced apart to this same axial dimension. The tubing selected will have the minimum wall thickness consistent with the required strength of the support to give minimum resistance to the flow stream and minimum pressure loss therethrough.

To assemble the parts, the valve 20 is disposed vertically with its head 29 downwardly. The poppet member 34 is then dropped over the stem 28, followed by the sealing ring 35, washer 36 and spring 37. After this is accomplished, the washer 26 is placed around the stem and pressed downwardly to compress the spring 37 so as to expose the central collar 31. The tubes 25 are now clustered about the stem portion 33 between the collars 31 and 32, and are preferably held in place by a temporary assembly tool, such as a cylinder with protruding smaller cylinders of diameters that will fit the inner diameters of the tubes, while the tube holder 22 is assembled thereover. The temporary assembly tool for the tubes 25 is removed prior to the completion of this last assembly operation. The parts will now exist as a unitary subassembly unless the tube holder 22 is purposely pulled to the rear. This subassembly may now be pushed into the tubular body member 11 from the rear, followed by the spring 27 and secured by the threaded plug 21, which compresses the spring 27 and thereby propels the subassembly into its forwardmost position and holds the tube holder 22 normally forward, except for the extraordinary clearance movement, as described above.

In assembling the male member of FIGURE 4, the valve 48 with its associated parts, and the cluster of supporting tubes 43 are simply slid forwardly from the rear of the body member 41 and the ring 44 snapped in the groove 45 to hold the supporting structure against rearward movement.

It will be appreciated that to keep the pressure losses through the supporting structure at a minimum, the wall of the tubing will be only as thick as required for the necessary strength of the assembly. Any number of tube lengths, preferably four or more, may be clustered together depending upon the relative dimensions of the suspended element and the diameter of the flow passage. Since standard commercial tubing is held to fairly close tolerances in terms of its exterior surface, the central positioning of the suspended element in the flow passage is assured and the fabrication of the guides or supports may consist only of cutting standard commercial tubing to length.

While certain preferred embodiments of the invention have been specifically illustrated and described, it will be understood that the invention is not limited thereto as many variations will be apparent to those skilled in the art, and the invention is to be given its broadest interpretation within the terms of the following claims.

I claim:
1. A supporting structure for suspending an element in a fluid flow stream comprising: a member having a passage therein for flow of fluid therethrough; an element supported within said passage with its axis substantially parallel to the axis of the passage; a cluster of relatively thin-walled tubes surrounding said element within said passage and serving to support the element therein, said tubes being of non-deformed cylindrical shape and disposed around said element with their axes substantially parallel to the axes of the element and the passage; and means restraining said tubes against involuntary displacement axially of said member and said element, including integral collars on said element spaced apart substantially the length of said tubes and interlocking with the opposite ends thereof.

2. A supporting structure for suspending an element in a fluid flow stream comprising: a member having a passage therein for the flow of fluid therethrough; an element supported within said passage with its axis substantially parallel to the axis of the passage; and a cluster of relatively thin-walled tubes surrounding said element within said passage and serving to support the element therein, said tubes being disposed around said element with their axes substantially parallel to the axes of the element and the passage, said tubes being of non-deformed cylindrical shape of substantially the same length and cut from standard commercial size tubing and of a wall thickness of the minimum consistent with the desired strength of the supporting structure.

3. A supporting structure for suspending an element in a fluid flow stream comprising: a member having therein a cylindrical passage for the flow of fluid therethrough; an element supported within said cylindrical passage with its axis substantially coincident with the axis of said passage, said element presenting a cylindrical external surface substantially concentric with the surface of said passage; a cluster of tubes of non-deformed cylindrical shape of at least three in number and of substantially uniform diameter and length, said tubes being disposed circumferentially about said element and the exterior diameters of said tubes being such that the exterior tube surfaces substantially engage both the interior surface of the cylindrical passage and the exterior surface of the cylindrical element without deformation of the tubes.

4. A supporting structure for suspending an element in a fluid flow stream comprising: a member having therein a cylindrical passage for the flow of fluid therethrough; an element supported within said cylindrical passage with its axis substantially coincident with the axis of said passage, said element presenting a cylindrical external surface substantially concentric with the surface of said passage; a cluster of tubes of non-deformed cylindrical shape of at least three in number and of substantially uniform diameter and length, said tubes being disposed circumferentially about said element and the exterior diameters of said tubes being such that the exterior tube surfaces substantially engage both the interior surface of the cylindrical passage and the exterior surface of the cylindrical element without deformation of the tubes, the exterior surfaces of said tubes also engaging the exterior surfaces of the contiguous tubes.

5. A supporting structure for suspending an element in a fluid flow stream comprising: a member having therein a cylindrical passage for the flow of fluid therethrough; an element supported within said cylindrical passage with its axis substantially coincident with the axis of said passage, said element presenting a cylindrical external surface substantially concentric with the surface of said passage; a cluster of tubes of non-deformed cylindrical shape of at least four in number and of substantially uniform diameter and length, said tubes being disposed circumferentially about said element and the exterior diameters of said tubes being such that the exterior tube surfaces substantially engage both the interior surface of the cylindrical passage and the exterior surface of the cylindrical element without deformation of the tubes, the exterior surfaces of said tubes also engaging the exterior surfaces of the contiguous tubes.

6. A supporting structure for suspending an element in a fluid flow stream comprising: a member having a passage therein for flow of fluid therethrough; an element supported within said passage with its axis substantially parallel to the axis of the passage; a cluster of relatively thin-walled tubes surrounding said element within said passage and serving to support the element therein, said tubes being of non-deformed cylindrical shape and disposed around said element with their axes substantially parallel to the axes of the element and the passage; and means restraining said tubes against involuntary displacement axially of said member and said element, including integral collars on said element spaced apart substantially the length of said tubes and interlocking with the opposite ends thereof, said opposite tube ends lying in planes substantially at right angles to the axes of said tubes.

7. A supporting structure for suspending an element in a fluid flow stream comprising: a member having therein a cylindrical passage for the flow of fluid therethrough; an element supported within said cylindrical passage with its axis substantially coincident with the axis of said passage, said element presenting a cylindrical external surface substantially concentric with the surface of said passage; a cluster of tubes of non-deformed cylindrical shape of at least three in number and of substantially uniform diameter and length, said tubes being disposed circumferentially about said element and the exterior diameters of said tubes being such that the exterior tube surfaces substantially engage both the interior surface of the cylindrical passage and the exterior surface of the cylindrical element without deformation of the tubes, the exterior surfaces of said tubes also engaging the exterior surfaces of the contiguous tubes, said tubes being stationarily mounted and having their surfaces which engage said element serving as guides for sliding movement of the element within the space defined by the tube cluster.

8. A supporting structure for suspending an element in a fluid flow stream comprising: a member having a passage therein for the flow of fluid therethrough; an element supported within said passage with its axis substantially parallel to the axis of the passage; and a cluster of relatively thin-walled tubes surrounding said element within said passage and serving to support the element therein, said tubes being disposed around said element with their axes substantially parallel to the axes of the element and the passage, said tubes being of non-deformed cylindrical shape of substantially the same length and cut from standard commercial size tubing and of a wall thickness of the minimum consistent with the desired strength of the supporting structure, the exterior diameters of said tubes being substantially equal and such that the exterior surfaces of said tubes substantially touch all of: the surfaces of the contiguous tubes, the surface of the flow passage and the surface of said element whereby to support the element by lengths of standard tubing against transverse movement within the passage.

References Cited
UNITED STATES PATENTS

| | | | |
|---|---|---|---|
| 2,439,760 | 4/1948 | Thomas | 137—614.03 |
| 2,707,972 | 5/1955 | Cole | 138—39 |
| 3,009,716 | 11/1961 | Bradfute | 137—614.04 |
| 3,073,342 | 1/1963 | Magorien | 137—614.03 |

M. CARY NELSON, *Primary Examiner.*

W. R. CLINE, *Assistant Examiner.*